(12) United States Patent
Wu et al.

(10) Patent No.: US 8,578,049 B2
(45) Date of Patent: Nov. 5, 2013

(54) CONTENT ROUTER FORWARDING PLANE ARCHITECTURE

(75) Inventors: Jianming Wu, San Jose, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 92 days.

(21) Appl. No.: 13/022,412

(22) Filed: Feb. 7, 2011

(65) Prior Publication Data

US 2012/0084459 A1 Apr. 5, 2012

Related U.S. Application Data

(60) Provisional application No. 61/389,548, filed on Oct. 4, 2010, provisional application No. 61/394,211, filed on Oct. 18, 2010.

(51) Int. Cl.
*G06F 15/173* (2006.01)

(52) U.S. Cl.
USPC .......................................................... 709/238

(58) Field of Classification Search
USPC ........................ 709/238, 239, 240, 241, 242
See application file for complete search history.

(56) References Cited

U.S. PATENT DOCUMENTS

| | | | |
|---|---|---|---|
| 7,602,785 B2 * | 10/2009 | Dharmapurikar et al. | .... 370/392 |
| 7,672,336 B2 | 3/2010 | Bharrat et al. | |
| 7,680,923 B1 * | 3/2010 | Allan | ............................ 709/224 |
| 2005/0195832 A1 | 9/2005 | Dharmapurikar et al. | |
| 2008/0134327 A1 * | 6/2008 | Bharrat et al. | .................. 726/22 |

FOREIGN PATENT DOCUMENTS

| | | |
|---|---|---|
| CN | 101567815 A | 10/2009 |
| WO | 2005006129 A2 | 1/2005 |

OTHER PUBLICATIONS

Foreign Communication From a Related Counterpart Application, PCT Application PCT/CN2011/073770, International Search Report dated Aug. 18, 2011, 3 pages.

Foreign Communication From a Related Counterpart Application, PCT Application PCT/CN2011/073770, Written Opinion dated Aug. 18, 2011, 7 pages.

(Continued)

*Primary Examiner* — Larry Donaghue
*Assistant Examiner* — Marshall McLeod
(74) *Attorney, Agent, or Firm* — Conley Rose, P.C.; Grant Rodolph; Ryan L. Lobato (57) ABSTRACT

A router forwarding plane comprising a bloom filter stored on a first tier storage medium, and a forwarding information log associated with the bloom filter and stored on a second tier storage medium. Also disclosed is a network component comprising a receiver configured to receive a content comprising a general name prefix, a first tier storage medium configured to store a plurality of bloom filters associated with a plurality of general name prefixes and a plurality of corresponding ports, a logic circuitry configured to compute a plurality of signatures based on the general name prefix of the received content, and a transmitter configured to forward the received content on at least one of the ports that are associated with at least one of the bloom filters if the general name prefix is a member of the at least one of the bloom filters.

22 Claims, 5 Drawing Sheets

(56) References Cited

OTHER PUBLICATIONS

Foreign Communication From A Counterpart Application, European Application No. 11830196.9, Extended European Search Report dated Jun. 27, 2013, 8 pages.

Yu, M., et al., "Hash, Don't Cache: Fast Packet Forwarding for Enterprise Edge Routers," WREN '09 Proceedings of the 1st ACM Workshop on Research on Enterprise Networking, Dec. 1, 2009, pp. 37-44.

Yu, M., et al., "Buffalo: Bloom Filter Forwarding Architecture for Large Organizations," CoNEXT '09 Proceedings of the 5th International Conference on Emerging Networking Experiments and Technologies, Jun. 11, 2009, pp. 313-324.

* cited by examiner

CONTENT ROUTER FORWARDING PLANE ARCHITECTURE

CROSS-REFERENCE TO RELATED APPLICATIONS

The present application claims priority to U.S. Provisional Patent Application No. 61/389,548 filed Oct. 4, 2010 by Jianming Wu et al. and entitled "High Capacity and Performance Software Content Router Storage Architecture for Commodity Servers," and U.S. Provisional Patent Application No. 61/394,211 filed Oct. 18, 2010 by Jianming Wu et al. and entitled "High Capacity and Performance Software Content Router Storage Architecture for Commodity Servers," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Current Internet Protocol (IP) networks comprise a plurality of nodes, including a plurality of routers at the core of the network and a plurality of hosts at the edge of the network. The routers collectively link the communication channels between hosts. The nodes are assigned network-wide unique IP addresses to enable proper and efficient traffic forwarding to destination nodes. The routers route packets in the IP networks based on the IP addresses carried in the packets. The packets are forwarded by the routers to proper destinations based on a <source address, destination address> pair, which may be indicated in each packet. IP version 4 (IPv4) is a commonly deployed IP protocol in many networks, such as Local Area Networks (LANs) and the Internet. An IPv4 address comprises about 32 bits, including an IP address prefix that comprises up to about 24 bits. Accordingly, a router can handle up to about 16 million (or $2^{24}$) destination addresses. The IP addresses may also be allocated in blocks based on different geographical areas, which allows the aggregation of IP addresses based on geographical area and thus reduces the search space for destinations at the router.

Some current networks include content networks that provide content or services to customers, such as on-demand content. In a content network, a content router is responsible for routing user requests and content to proper recipients. In the content network, a domain-wide unique name is assigned to each entity that is part of a content delivery framework. The entities may comprise data content, such as video clips or web pages, and/or infrastructure elements, such as routers, switches, or servers. The content router uses general name prefixes (which can be full content names or proper prefixes of content names) to route content packets within the content network. As such, the routing decision space is extended a substantially larger name space in comparison to the limited IP prefix space, which presents some problems to current router architectures or schemes, e.g. which are based on IP address forwarding.

SUMMARY

In one embodiment, the disclosure includes a router forwarding plane comprising a bloom filter stored on a first tier storage medium, and a forwarding information log associated with the bloom filter and stored on a second tier storage medium.

In another embodiment, the disclosure includes a network component comprising a receiver configured to receive a content comprising a general name prefix, a first tier storage medium configured to store a plurality of bloom filters associated with a plurality of general name prefixes and a plurality of corresponding ports, a logic circuitry configured to compute a plurality of signatures based on the general name prefix of the received content, and a transmitter configured to forward the received content on at least one of the ports that are associated with at least one of the bloom filters if the general name prefix is a member of the at least one of the bloom filters.

In a third aspect, the disclosure includes a computer-implemented method comprising receiving an item of content, obtaining a general content prefix from the content, querying a plurality of bloom filters to find at least one match for the general content prefix, and forwarding the content on a at least one port associated with at least one bloom filter matching the general content prefix.

In a fourth aspect, the disclosure includes a router forwarding plane comprising a counting bloom filter stored on a first tier storage medium, and a forwarding information log associated with the counting bloom filter and stored on a second tier storage medium.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently unknown or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As the Internet evolves, content networks become more popular, e.g. due to increasing demand for video content, mobile hosts, and content security. In a content network, a data or network entity may be associated with a network-wide unique name that indicates the entity and makes it reachable for a user of the network. The network entity may provide the same content from a plurality of distributed servers. The content network operates at the level of content, where general content name prefixes are used to route information, e.g. instead of IP addresses in the packets. Thus, content users may request content by the same name, but the network may route their requests to different servers that provide the requested content, e.g. based on the users' locations.

However, due to the substantially large content name space requirements in content networks, establishing a content router forwarding plane for handling substantially large quantities of name prefixes with acceptable efficiency may be challenging. Since the number of content entities may be substantially greater than the number of IP network nodes, the search space for content names may be substantially larger than the search space for IP addresses. Additionally, the content name space may be sparse because of content naming requirements. For example, in a content network that has a name length of up to about 64 bytes, the total number of potential names may be less than or equal to about $2^{512}$. If only human readable characters are allowed, such as in current Uniform Resource Locator (URL) formats, then the number of names may be equal to about $2^{360}$, which is more than a googol. Further, there is currently no efficient name aggregation method available. Unlike IP addresses, content names or name prefixes may not be grouped in geographical areas, and thus may not be aggregated based on geographical area to reduce the name space at the router.

Disclosed herein is a system and method for a router forwarding plane architecture, which may be used for content routing. The router forwarding plane architecture may allow content name forwarding in content networks with improved scalability and performance, e.g. in comparison to IP address forwarding schemes. The router forwarding plane architecture may comprise a three-tier memory and/or storage system that may be established using available commercial or commodity servers and software, which may reduce cost. The three-tier memory/storage system may comprise a bloom filter, a counting bloom filter, and a forwarding information log, which may be components comprising software, hardware, firmware, or combinations thereof that are maintained at three respective memory/storage hardware component tiers. The router forwarding plane architecture may provide relatively fast content forwarding and large storage that may support the substantially large content name space requirements. Additionally, the router forwarding plane architecture may provide relatively fast error recovery, e.g. in the case of hardware failures.

Figure 1:
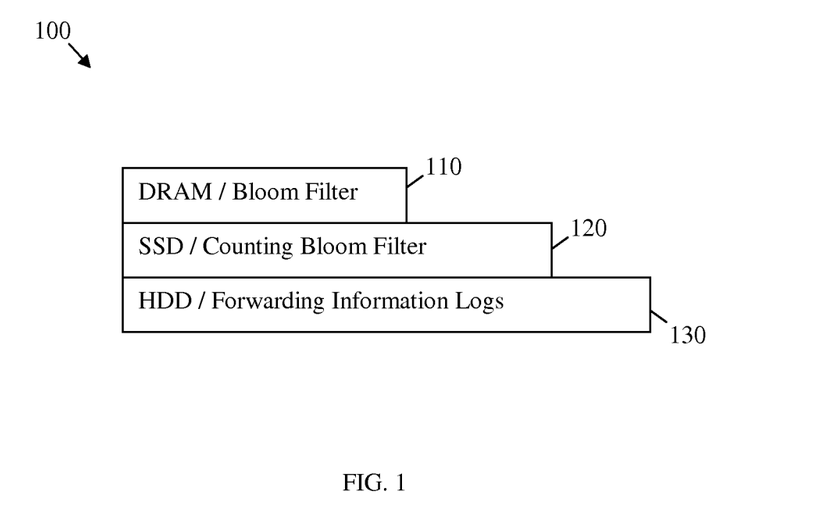
FIG. 1 is a schematic diagram of an embodiment of a router forwarding plane architecture.

FIG. 1 illustrates an embodiment of a router forwarding plane architecture 100, which may be used for content routing in a network. For example, the network may be any communications network that provides services for end users, including Ethernet based networks, Internet Protocol (IP) networks, passive optical networks (PONs), digital subscriber line subscriber (DSL) networks, wireless networks, other communications networks, or combinations thereof. Alternatively, the network may be a core network that implements a core network protocol, such as Ethernet, IP, or Transmission Control Protocol (TCP). The content may comprise data, voice, video, Television (TV), Internet, and/or any application specific content, such as gaming content. The end user may be any content provider/customer of the network and/or any user equipment coupled to the network. For example, the end user may be associated with user equipment at a customer premise, such as an optical network terminal (ONU) or a very high bit rate DSL (VDSL) transceiver unit at a residential location (VTU-R). Alternatively, the end user may correspond to home communication equipment, such as a set-top box, a fixed personal device, such as a desktop computer, or a mobile personal device, such as a cellular phone, a laptop computer, or a portable pad.

The router forwarding plane architecture 100 may comprise a three-tier memory/storage system that may be established in a node or router using available hardware, such as commodity servers, and installed software. Specifically, the three-tier memory/storage system may comprise a bloom filter 110, a counting bloom filter 120, and a forwarding information log 130, which may be software or data structure components installed and maintained at three respective memory/storage hardware component tiers. The router forwarding plane architecture 100 may also comprise additional software components, such as a port preference table (not shown), which may be located at the first memory/storage tier.

The bloom filter 110 may be a software component or data structure configured for querying members, e.g. incoming general name prefixes, for each port of the router. The bloom filter 110 may comprise an array of binary bits that may be used to store or register a collection of signatures for a plurality of members associated with the bloom filter 110 and the associated port. For each member, one or more signatures may be generated using one or more corresponding hashing functions, where the same hashing functions may be used to generate the signatures for a plurality of members. For instance, a set of hashing functions may be applied to a plurality of general name prefixes, which may be members of the bloom filter 110, to generate a set of signatures for each name prefix. Each signature in the set of signatures may correspond to one hashing function in the set of hashing functions. Each member signature in the set of signatures may be indicated or represented by setting one bit in the bloom filter 110.

For each port in the node, a new member may be added to the associated bloom filter by setting the bits in the bloom filter 110 to indicate the signatures obtained using the hashing functions. For routing content, the signatures of an incoming name prefix may be calculated using the hashing functions and the resulting bit values may be compared to the bits of the bloom filter 110 for each port. The content may then be forwarded via one of the ports if the name prefix is a member of the bloom filter 110 of that port, e.g. if the signatures of the name prefix match the corresponding bit values in the bloom filter 110.

The counting bloom filter 120 may be a software component or data structure configured to support deleting members of the bloom filter 110. The counting bloom filter 120 may comprise a set of binary bits for each bit in the bloom filter 110 that corresponds to one signature. The set of bits for each signature may indicate the current or last updated quantity of members that share the same signature in the bloom filter 110. The quantity of bits in the set of bits for each signature may determine the maximum number of members that may share the same signature in the bloom filter 110. When a member is removed or deleted from the set of members of the port associated with the bloom filter 110, the quantity of members indicated in the corresponding set of bits in the counting bloom filter 120 may be reduced by one. Alternatively, the quantity of members indicated in the set of bits in the counting bloom filter 120 may be increased by one when a new member that has a signature corresponding to the set of bits is added to the set of members of the port. When the last remaining member that has a signature corresponding to the set of bits in the counting bloom filter 120 is deleted from the set of members of the port, the quantity of members indicated by the set of bits may be reduced to about zero and the corresponding bit in the bloom filter 110 may be reset, e.g. to about zero.

The forwarding information log 130 may be a software component or data structure that comprises data that may be used for proper routing of content in the network, such as name prefixes, different content arrival times, and any other related routing information. The routing information may be appended to the forwarding information log 130 as the information arrives to the router. Thus, the forwarding information log 130 may maintain the current or last updated routing information for the router. The information in the forwarding information log 130 may not be used directly to route content and/or process name prefixes, e.g. in real time, but may be used to reconstruct the bloom filter 110 and/or the counting bloom filter 120 in the case of loss of information in the bloom filter 110 and/or the counting bloom filter 120, e.g. due to storage medium failure, hardware failure, or software failure. For example, the forwarding information log 130 may be used to reconstruct at least a portion of the counting bloom filter 120, which may be used to reconstruct at least a portion of the bloom filter 110. The forwarding information log 130 in one or more first routers may also be used to recover similar routing information in one or more second routers if the second routers fail.

Current router architecture, e.g. that are based on IP routing and forwarding schemes, may not allow routers to handle the substantially large amount of general content name prefixes at an acceptable network speed, e.g. without exceeding acceptable network cost. For instance, current IP routers may be configured to handle about 16 million IP address prefixes at most, e.g. according to the IPv4 specification. Such routers may need larger memory space, cluster technologies, and/or specific hardware to extend the name lookup space and thus handle content routing, which may add system cost. Alternatively, the routers may use advanced or complicated lookup algorithms or low-performance large-capacity storage devices, which may reduce system performance.

The three-tier memory/storage system of the router forwarding plane architecture 100 may remedy the deficiencies of the current router forwarding plane architecture. In the three-tier memory/storage system, the bloom filter 110 may be accessed more frequently and require faster response time and thus a faster memory storage medium than the other two components. The bloom filter 110 may also comprise less data and thus require less storage space than the other two components. Similarly, the counting bloom filter 120 may be accessed more frequently and require faster response time and thus a faster storage medium than the forwarding information log 130. The counting bloom filter 120 may also comprise less data and require less storage space than the forwarding information log 130.

Since the three components of the router forwarding plane architecture 100 may have different storage space, memory access speed and latency requirements, the three components may be placed on different storage mediums of different storage size and memory access speed, as required, to reduce the system cost without substantially reducing performance. As such, a first memory/storage medium for the first memory/storage tier (e.g. for the bloom filter 110) may have higher performance, e.g. in terms of memory access speed or latency, than the other two tiers. The first memory/storage medium may also have higher unit cost in comparison to the remaining tiers due to the higher performance feature. However, since the bloom filter 110 may have lower storage space requirements than the other two components, the cost of the first memory/storage medium may be limited by limiting the storage capacity of the first memory/storage medium as needed to support the bloom filter 110.

Similarly, a second memory/storage medium for the second memory/storage tier (e.g. the counting bloom filter 120) may have higher memory access speed (and/or lower memory access latency), and higher unit cost in comparison to the third tier. The cost of the second memory/storage medium may also be limited by limiting the storage capacity of the second memory/storage medium as needed to support the counting bloom filter 120. The third memory/storage medium for the second memory/storage tier (e.g. the forwarding information log 130) may have lower memory access speed, lower unit cost, and higher capacity, in comparison to each of the first tier and the second tier.

In one example, the bloom filter 110 may be hosted in a Dynamic Random Access Memory (DRAM), the counting bloom filter 120 may be hosted in a Solid State Drive (SSD), and the forwarding information log 130 may be hosted in a Hard Disk Drive (HDD). In other examples, other memory/storage media may be used to host the three components. For example, the bloom filter 110, the counting bloom filter 120, and the forwarding information log 130 may be hosted in a DRAM, a Phase-Change Memory (PCM), and a SSD, respectively.

Figure 2:
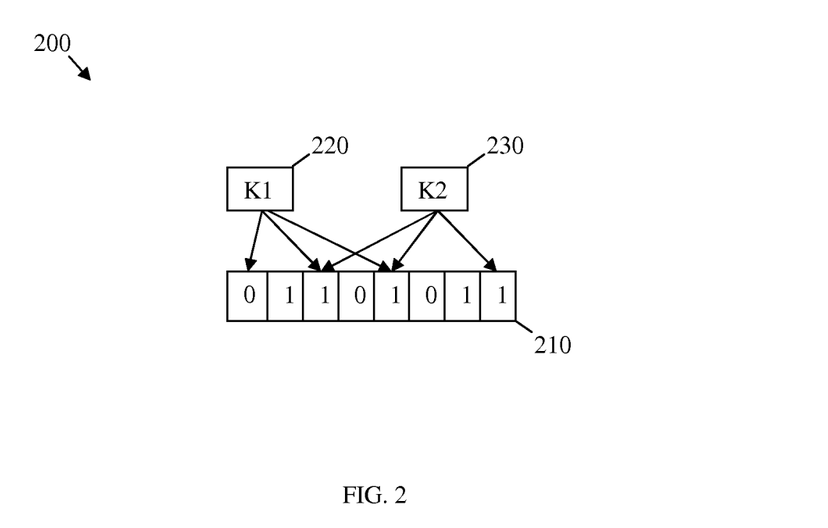
FIG. 2 is a schematic diagram of an embodiment of a bloom filter.

FIG. 2 illustrates an embodiment of a bloom filter 200, which may correspond to the bloom filter 110 in the router forwarding plane architecture 100. The bloom filter 200 may be associated with a port in a network node (e.g. content router) and may comprise a bit array 210. The bit array 210 may be stored in the first memory/storage tier (e.g. DRAM) and may comprise a plurality of bits, for example about eight bits as shown in FIG. 2. In other embodiments, the bit array 210 may comprise any quantity of bits, e.g. greater than about one. The bit array 210 may be configured to indicate one or more signatures for one or more members (e.g. general name prefixes) that are associated with the port. Each member may have a unique set of signatures that is represented by a different set of bits in the bit array 210.

For instance, each bit that corresponds to a signature for a member of the port may be set to about one. The remaining bits that may not correspond to a member's signature may be set to about zero. The set of signatures for all members of the port may comprise about the same quantity of signatures or bits. Initially, all the bits may be set to about zero, for example before assigning any member to the port. When a member (e.g. general content name prefix) is added to the port, the member's signatures may be calculated and the corresponding bits may be set in the bit array 210. As such, the bits of the bit array 210 may be updated each time a member is added.

To decide whether the name prefixes are members and accordingly forward the corresponding incoming content on the port, the signatures of the incoming names or prefixes may be calculated and matched to the bits in the bit array 210. For instance, the router may receive a first content associated with a first prefix (K1) 220 and a second content associated with a second prefix (K2) 230. Hence, a first set of signatures may be obtained for K1 and second set of signatures may be obtained for K2 using the same set of hashing functions. For example, about three first signatures for K1 and about three second signatures for K2 may be obtained using about three same hashing functions, which may map K1 and K2 into two different sets of values.

For example, the three signatures of the first prefix (K1) 220 may be equal to about zero, two, and four and correspond the first, third, and fifth bits in the bit array 210, respectively.

The three signatures of the second prefix (K2) 230 may be equal to about two, four, and seven, which may correspond to the third, fifth, and eighth bits in the bit array 210, respectively. Since one of the first signatures, e.g. that corresponds to the first bit (from left), is not set in the bit array 210 (e.g. has a corresponding zero bit), K1 may not be a member of the bloom filter 200, and thus the corresponding content may not be forwarded on the port associated with bloom filter 200. Since all the second signatures are set in the bit array 210 (e.g. have corresponding one bits), K2 may be a member of the bloom filter 200, and thus the corresponding content may be forwarded on the port associated with bloom filter 200.

A bloom filter similar to the bloom filter 200 may be used for each port in the node or router. Using the bloom filters to forward content on the ports of the router may replace the function of a forwarding table for the ports, such as used in typical IP address forwarding schemes. When a packet is received in the content router, the signatures may be calculated using the target's name in the packet and then used to query a plurality of bloom filters for a plurality of ports. If a match is found in one or more bloom filters, then the packet may be forwarded on one or more ports associated with the bloom filters. If none of the bloom filters match the signatures of the name or prefix in the packet, then the packet may be flooded (e.g. forwarded over all the ports) or may be discarded.

The bloom filters of the ports may be queried in parallel, e.g. at about the same time, at the memory access speed if the host medium is memory. The bloom filters may be queried in parallel using a Central Processing Unit (CPU) memory access caching mechanism, where the bloom filters may be aligned in a cache line of the CPU memory. For example, the size of a cache line in INTEL's modern CPUs is equal to about 64 bytes. As such, up to about 512 bloom filters may be queried at about the same time if the bloom filters are aligned properly in the memory. Additionally, the signatures for the same name or prefix may be checked or matched with the bloom filters at about the same time. Since the hashing functions used to calculate the signatures (for each name or prefix) are independent from one another, each CPU core may implement one of the hashing functions for one name prefix, and all the CPU cores may work in a parallel manner to calculate all the signatures. In current hardware, a server may comprise about more than eight CPU cores, which may allow the content router to query about 512 bloom filters for all the signatures (e.g. about eight signatures per prefix) per one memory access.

The bloom filter may be stored in a first tier memory/storage medium that has the lowest access latency in the three-tier memory/storage system. Current DRAMs, such as double-data-rate three (DDR3) synchronous DRAMs (DDR3 SDRAMs), may have a low access latency of about 10 nanoseconds, which may be suitable for the operations of the bloom filters. However, the capacity of the DRAMs may be relatively low and the unit price may be relatively high in comparison to other storage devices. The maximum capacity of DDR3 SDRAMs on a single machine or server may be equal to about 96 Gigabytes (GB), and the unit price may be equal to about $30 per GB. Thus, the DRAM may be used at the first memory/storage tier to host the bloom filter.

Querying the bloom filter may depend on the quantity of hash functions used but may efficiently scale to a substantially large content name space, e.g. without substantial performance degradation. For example, a bit array of about 20 bits per member may be used to establish a bloom filter that has a false positive rate (FPR) of about 0.01 percent. A content router that comprises a memory of about 50 GB may handle about 20 billion general name prefixes, e.g. at about the same time. Such relatively fast query speed may provide high throughput for the content router. For example, a single server processing and storage system may handle a bit rate of about 3.2 terabits per second (Tbps) for relatively small content packets of about four kilobytes (KB) in size, such as web pages, and a bit rate of about eight petabits per second (Pbps) for relatively large content of about 10 megabytes (MB), such as video clips.

The FPR refers to the probability of obtaining a true value (or positive result) for querying a name prefix in a bloom filter that may not be a member of the bloom filter, for instance due the lossy, compressed representation of membership information. The design of the router forwarding plane architecture may be adjusted as needed to maintain the FPR of the bloom filter at an acceptable level. The FPR may be controlled by adjusting the quantity of hashing functions used and the size of bits per member in the bloom filter. For example, to achieve a FPR of about one percent, the bloom filter size in bits may be set to about 10 times the expected number of members and the quantity of hashing functions for signatures generation may be equal to about seven. Further, the FPR may not substantially affect or reduce the reachability or successful delivery of content in the network, but may add some amount of extra traffic. Typically in content networks, content may be forwarded using multi-path routing, e.g. instead of end-to-end models, and the intermediate nodes may have storage and/or cache capability. As such, routers in the network may establish multiple paths to improve or optimize network traffic conditions and ensure content delivery, which may be one of the design goals of content networks.

One of the challenges in using a bloom filter is the lack of a delete operation, e.g. to remove the signatures for a deleted member. For instance, when a member is removed from a port, the corresponding bits in the bloom filter may not be reset to about zero since some of the bits may be shared with other members, e.g. may correspond to signatures for other members. Resetting such shared bits may introduce a false negative rate to the bloom filter, e.g. may return a false value for querying true members in the bloom filter. This situation may complicate the operation of the bloom filter and degrade the performance of the content router. Instead, a counting bloom filter may be associated with the bloom filter and used to provide an efficient delete operation for the bloom filter.

Figure 3:
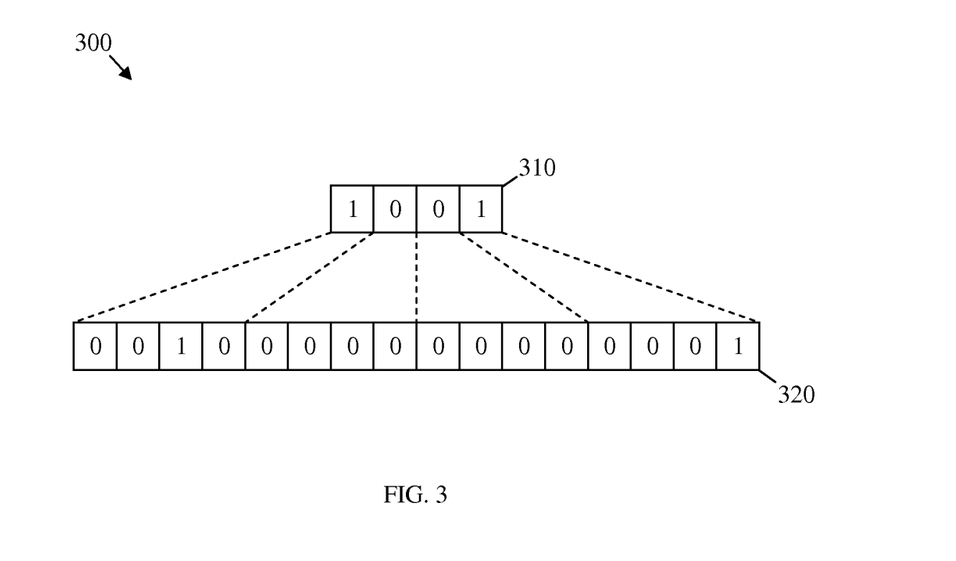
FIG. 3 is a schematic diagram of an embodiment of a bloom filter and counting bloom filter combination.

FIG. 3 illustrates an embodiment of a bloom filter and counting bloom filter combination 300, which may comprise a bloom filter 310 and a counting bloom filter 320. For instance, the bloom filter 310 and the counting bloom filter 320 may correspond to the bloom filter 110 and the counting bloom filter 120. The bloom filter 310 may be associated with a port in a content router, comprise a bit array of about four bits, and stored in the first memory/storage tier (e.g. DRAM). The bloom filter 310 may operate substantially similar to the bloom filter 200.

The counting bloom filter 320 may be associated with the bloom filter 310 and the port and may comprise a plurality of subsets or sub-arrays of about equal bits that correspond each to one of the bits of the bloom filter 310. For instance, the counting bloom filter 320 may comprise a total of about 16 bits, where each subset of about four bits may be associated with a corresponding bit in the bloom filter 310. The quantity of bits in each subset in the counting bloom filter 320 may be determined based a Poisson approximation, which suggests that about four bits per one bit or signature in the bloom filter 310 may be sufficient to cover a maximum expected quantity of members per signature. However, in other embodiments, any quantity of bits may be used in the subsets of the counting bloom filter 320, e.g. more than one bit per signature. The counting bloom filter 320 may be stored in the second memory/storage tier (e.g. SSD).

The counting bloom filter 320 may support add and delete operations for the bloom filter 310. Each subset of bits in the counting bloom filter 320 may extend the bi-mode status (e.g. set or not set) of the corresponding bit in the bloom filter 310. While the bit in the bloom filter 310 may indicate whether a corresponding signature (for a name prefix) is set or not set, the subset of corresponding bits in the counting bloom filter 320 may operate as a encoded counter that indicates the quantity of current members associated with the signature. The counter may be used to update the current quantity of members per signature. When a member of a signature is removed, the counter may be reduced by one and when a member is added, the counter may be increased by one. For example, when a signature is not set for any member, the corresponding bit in the bloom filter 310 may be equal to about zero and the associated subset of bits in the counting bloom filter 320 may also indicate about zero. Alternatively, when the signature is set for one or more members, the corresponding bit in the bloom filter 310 may be equal to about one and the associated subset of bits in the counting bloom filter 320 may indicate the quantity of members, e.g. may be greater than about one. Thus, the bloom filter 320 may server to maintain an updated record of the quantity of members assigned to each port, which may be useful to track link utilization and improve overall all network performance.

The counting bloom filter 320 may be stored in the second tier memory/storage medium, which may have a balance between performance and cost, lower access latency than the third tier, and lower unit price than the first tier of the memory/storage system. For instance, current SSDs may be suitable for storing the counting bloom filter 320 at the second tier of the memory/storage system. A SSD may use a flash memory as the storage medium, which is one type of non-volatile media. The average access latency of the SSD may be equal to about 100 microseconds and the unit price may be equal to about $3 per GB.

Figure 4:
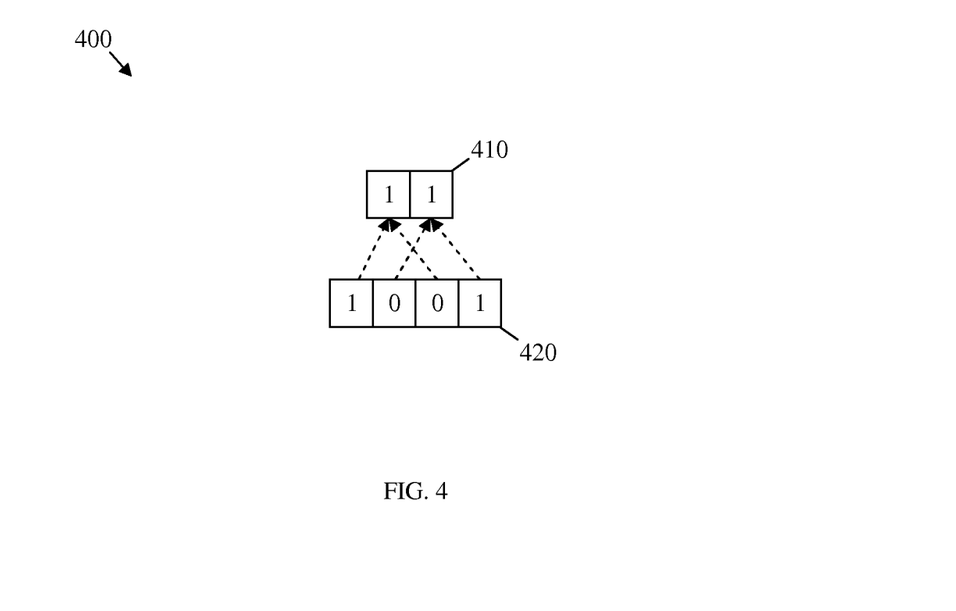
FIG. 4 is a schematic diagram of another embodiment of a scaled bloom filter.

The counting bloom filter in the second memory/storage tier may also allow scaling the bloom filter in the first memory/storage tier, e.g. to grow and shrink the bloom filter size based on demand. FIG. 4 illustrates an embodiment of bloom filter scaling 400 from bloom filter 420 to bloom filter 410, which reduces the size of bloom filter 420 to about half its size in bloom filter 410 to allow more free space in the first memory/storage tier in the trade-off of a higher FPR. The bloom filter may be scaled from a second bloom filter 420 that corresponds to the bloom filter 310 and comprises about four bits into a first bloom filter 410 that comprise about two bits. As such, each two bits in the second bloom filter 420 may be mapped into a single bit in the first bloom filter 410. Thus, the total quantity of members may not be changed, but their membership may be represented by fewer bits. Generally, the second bloom filter 420 may be wrapped for multiple folds to derive the smaller bloom filter 410 or even smaller bloom filters.

The size of the first bloom filter 410 may be scaled to maintain a near constant density rate or a fixed FPR as its member count changes. For instance, when the FPR of the first bloom filter 410 is about to exceed a pre-set value or a threshold, e.g. due to an increase of the bloom filter members, a larger bloom filter such as the second bloom filter 420 may be constructed from the counting bloom filter 320 to represent a more accurate membership information than the first bloom filter 410. Thus, the existence of the counting bloom filter allows the bloom filter stored in the first memory/storage tier to dynamically grow its size as the member count increases.

As shown in FIG. 4, the first and third bits (from left) in the second bloom filter 420 may be mapped into the first bit (from left) in the first bloom filter 410. Similarly, the second and fourth bits in the second bloom filter 420 may be mapped into the second bit in the first bloom filter 410. The first bit in the first bloom filter 410 may be set (e.g. to about one) if one or both of the two corresponding signatures are associated with members and may not be set (e.g. may be equal to about zero) if both corresponding signatures are not associated with members. Similarly, the second bit in the first bloom filter 410 may be set if one or both of the two corresponding signatures are associated with members and may not be set if both corresponding signatures are not associated with members.

If the first bit in the first bloom filter 410 is set, the ambiguity as to which of the two corresponding signatures is/are set may be resolved by checking the corresponding counting bloom filter, e.g. the counting bloom filter 320. For instance, the first subset (from left) in the counting bloom filter 320 may indicate more than about one member for the first of the two corresponding signatures for the first bit in the second bloom filter 420 and the second subset in the counting bloom filter 320 may indicate zero members for the second of the two corresponding signatures. Similarly, if the second bit in the first bloom filter 410 is set, the ambiguity as to which of the two corresponding signatures is/are set may be resolved by checking the corresponding counting bloom filter 320. For instance, the third subset in the counting bloom filter 320 may indicate zero members for the first of the two corresponding signatures for the second bit in the second bloom filter 420 and the fourth subset in the counting bloom filter 320 may indicate about one member for the second of the two corresponding signatures.

The forwarding information log, e.g. the forwarding information log 130, may be stored in the third tier memory/storage medium, where each new routing information message may be appended to the log. Appending the routing information to the log may maintain and track a timeline of the routing events, which may enable a scan-and-replay of the log. Additionally, the appended information may increase storage performance, e.g. using the sequential writing capability if in a HDD. The forwarding information log in the third tier memory/storage system may be used for system failure recovery. For instance, when a system (hardware or software) failure occurs, the counting bloom filter at the second tier may be fully or partially reconstructed by a scan-and-replay of the forwarding information log 130, e.g. from the failure point or time. If the third tier memory/storage medium is also damaged, the content router may contact neighboring router(s) and request the damaged or lost portion of the log.

Since the recovery part may be selective, e.g. based on requested information, the downtime window for recovery may be substantially short, e.g. at about a few or several seconds. Thus, the convergence issues of routing information exchange protocols like Intermediate System to Intermediate System (IS-IS) and Open Shortest Path First (OSPF) may be alleviated. In some embodiments, the bloom filters and counting bloom filters may also be stored at the third tier for persistency and duplication purposes. Further, the exchange of forwarding information in the log may be configured in the form of bloom filters, e.g. instead of an original form of routing information in routers. As such, the bandwidth required to exchange the forwarding information may be substantially reduced due to the compact size of bloom filters.

The third tier memory/storage medium that hosts the forwarding information log may have the largest capacity and lowest unit price among the three tiers of the memory/storage system. The third tier memory/storage medium may also serve as a persistent storage of non-reconstructible forwarding information that may be difficult to or may not be reconstructed. The forwarding information log may comprise information that may not be used during the process of querying, routing, and forwarding content, e.g. in real time. For instance, current HDDs may be used for storing the forwarding information log at the third tier of the memory/storage system. The HDD is a common storage component for large capacity applications. For example, a performance oriented Serial Advanced Technology Attachment (SATA) HDD may provide access latency equal to about 10 milliseconds. Although, such storage medium may be slow in comparison to the first and second tier storage media (e.g, DRAM and SSD), the HDD may have a substantially lower unit price at about $0.05 per GB.

Another component of the router forwarding plane architecture may be the port preference table, which may be stored at the first or second tier memory/storage system. The port preference table may indicate a reference or preferred port for a queried general name prefix, such as when the general name prefix is matched with a plurality of bloom filters for a plurality of ports. The port preference table may specify the portion of some traffic on each port. For instance, the port preference table may comprise a plurality of entries, where each entry may indicate a port and an associated content prefix. Since multi-path routing is commonly used in content network, e.g. to improve content delivery, a content packet may be matched with a plurality of ports in a router. In the absence of port preference for the routed content, the ports associated with that content may be treated equally, and thus the content may be forwarded on all the associated ports. Alternatively, the port preference table may be used to select the preferred port and forward the content on the preferred port only. The port preference table may be set by an operator, e.g. manually, and may not comprise a substantially large number of entries, and thus may be stored in the first tier memory/storage system (e.g. DRAM) with the bloom filter. If the port preference table comprises a substantially large quantity of entries, then the table may be stored in the second tier memory/storage system (e.g. SSD) with the counting bloom filter.

Figure 5:
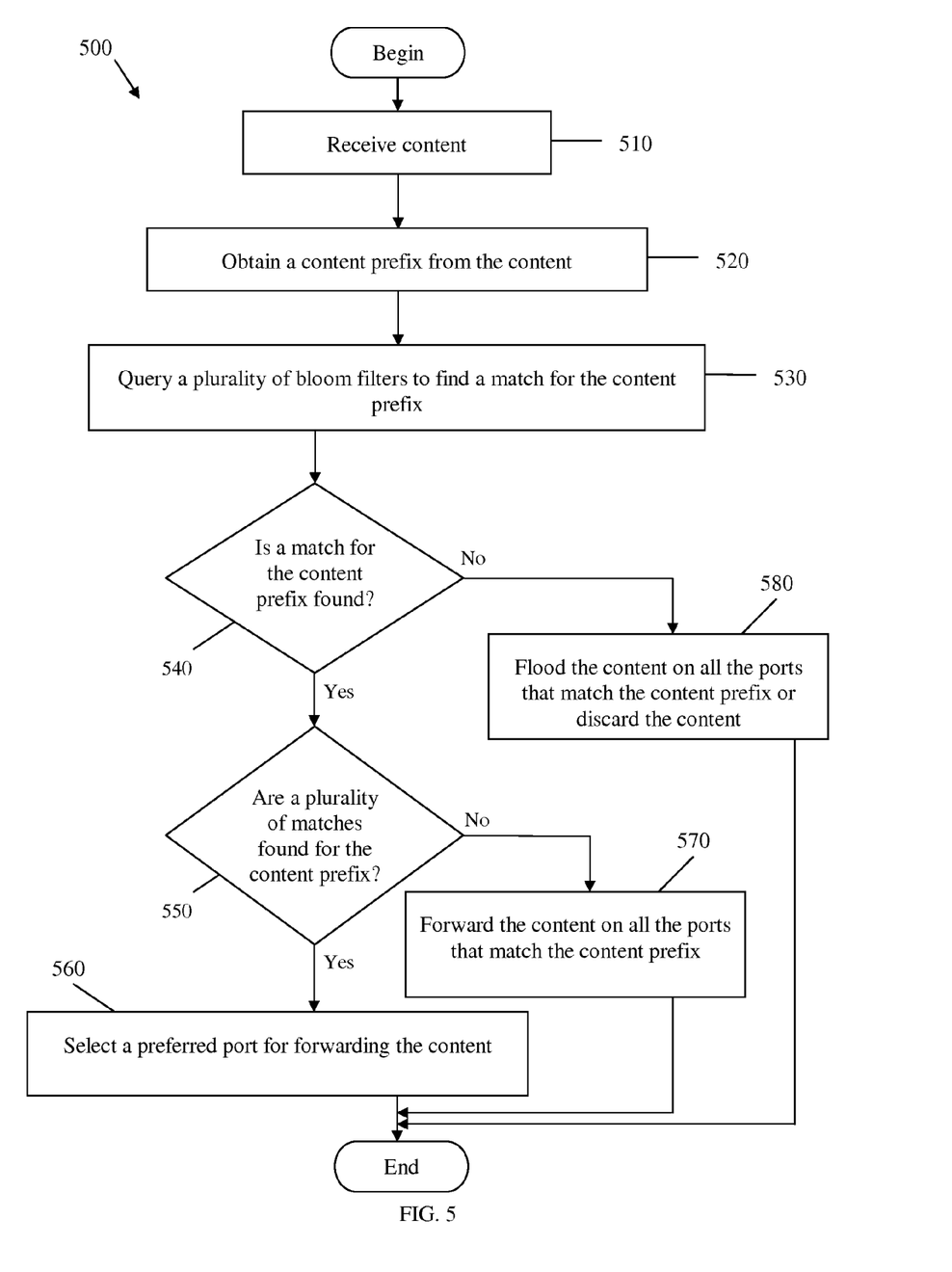
FIG. 5 is a flowchart of an embodiment of a router forwarding method.

FIG. 5 illustrates an embodiment of a router forwarding method 500, which may be used to forward content based on the router forwarding plane architecture described above. For instance, the router forwarding method 500 may be implemented by a router that comprises the three-tier memory/storage system. At block 510, a content may be received, e.g. on a port on the router. The content may be any content data, such as text, voice, video, Television (TV), Internet, and/or any application specific content or may be a request of content, e.g. from an end user, other router, or content server. At block 520, a content prefix may be obtained from the content. For example, the router may detect a name prefix in the content. At block 530, a plurality of bloom filters, e.g. at the first memory/storage tier, may be queried to find a match for the content prefix. The bloom filters may be associated with a plurality of ports of the router and may be queried in parallel, e.g. at about the same time, in memory (e.g. DRAM).

At block 540, the method 500 may determine whether a match for the content prefix is found. If a match is found, then the method 500 may proceed to block 550. Otherwise, the method 500 may proceed to block 580. At block 550, the method 500 may determine whether a plurality of matches is found for the content prefix. If a plurality of matches associated with a plurality of ports is found, then the method 500 may proceed to block 560. Otherwise, the method 500 may proceed to block 570. At block 560, a preferred port may be selected for forwarding the content. The preferred port may be selected from a port preference table and may be associated with the content prefix. At block 570, the content may be forwarded on all the ports that match the content prefix. At block 580, the content may be flooded on all ports, e.g. except the ingress port, or may be discarded. The method 500 may then end. In another embodiment, the method 500 may be used to route any content or data based on an address or a prefix, such as IP addresses that may be associated with a plurality of ports using a plurality of bloom filters.

Figure 6:
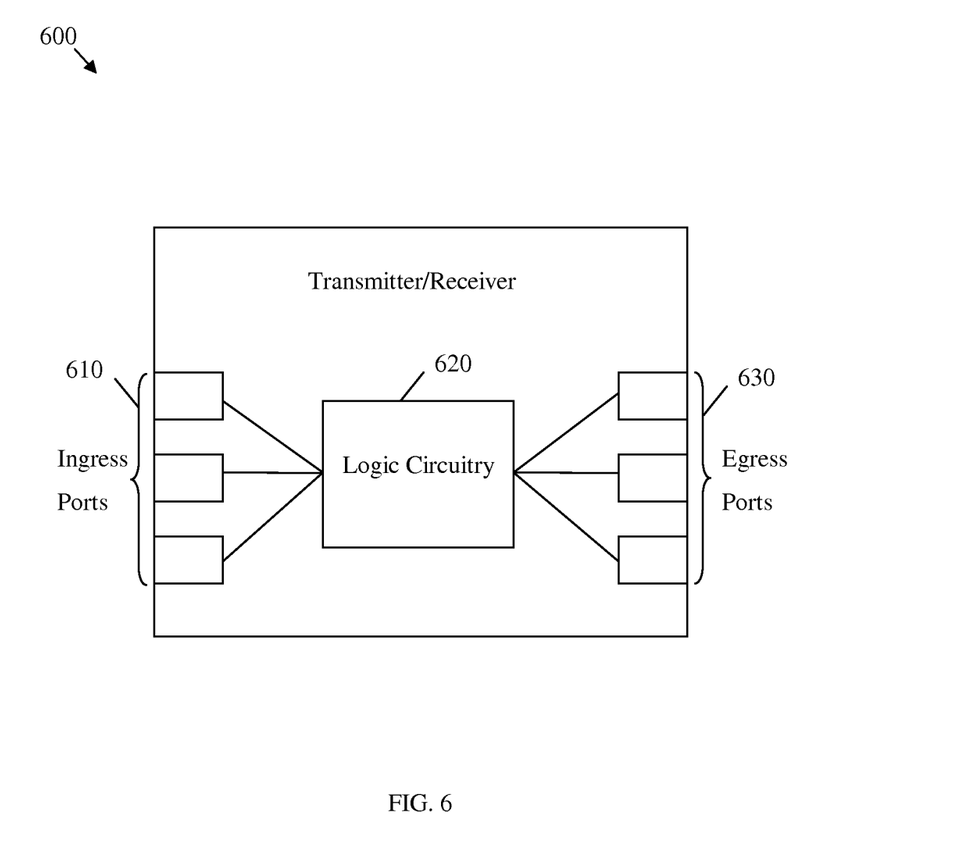
FIG. 6 is a schematic diagram of an embodiment of a transmitter/receiver unit.

FIG. 6 illustrates an embodiment of a transmitter/receiver unit 600, which may be any device that transports packets and/or contents through a network. For instance, the transmitter/receiver unit 600 may be located in the content router or any node in the content network. The transmitted/receiver unit 600 may comprise one or more ingress ports or units 610 for receiving packets, objects, or type-length-values (TLVs) from other network components, logic circuitry 620 to determine which network components to send the packets to, and one or more egress ports or units 630 for transmitting frames to the other network components.

Figure 7:
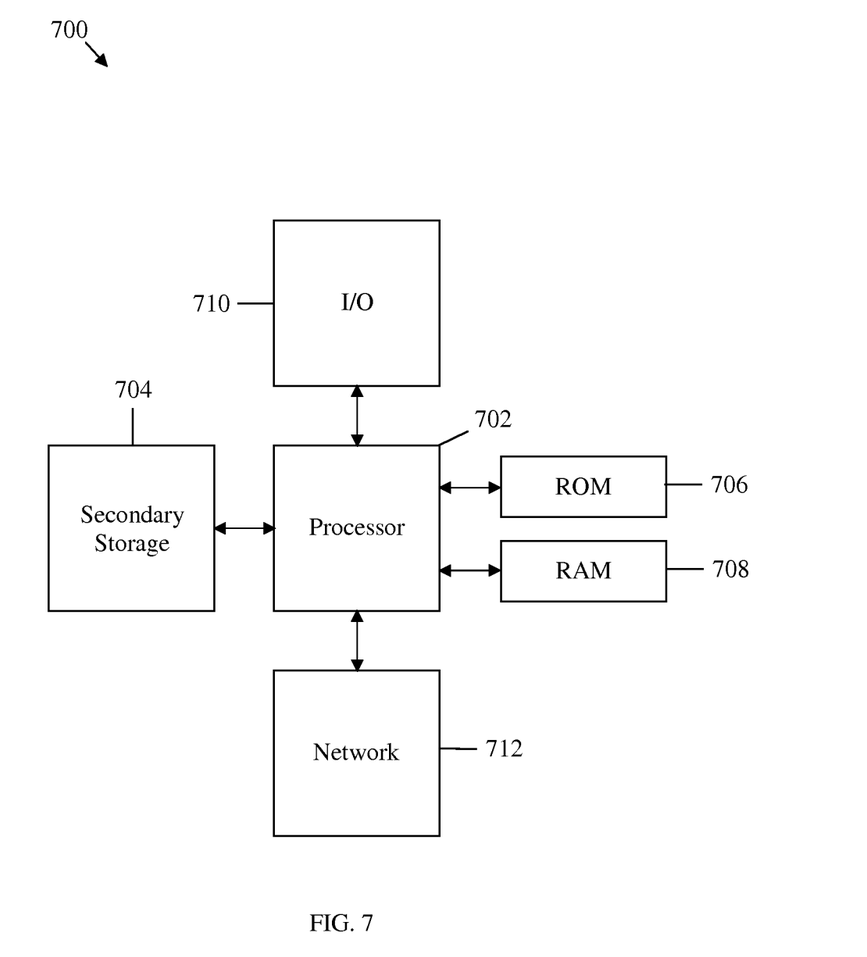
FIG. 7 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 9 7 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A router forwarding plane comprising:
   a bloom filter stored on a first tier storage medium;
   a forwarding information log associated with the bloom filter and stored on a second tier storage medium, wherein the first tier storage medium has a faster access speed and a smaller storage capacity than the second tier storage medium;
   a third tier storage medium configured to store a plurality of counting bloom filters associated with a plurality of bloom filters, wherein each one of the counting bloom filters indicates a quantity of members for each signature in the corresponding bloom filter; and
   a logic circuitry coupled to the first tier storage medium, the second tier storage medium, and the third tier storage medium, configured to use the forwarding information log to reconstruct at least some portion of the counting bloom filters, the bloom filters, or both upon system failures.

2. The apparatus of claim 1 further comprising a counting bloom filter associated with the bloom filter and stored on the third tier storage medium, and wherein the third tier storage medium has a faster access speed and a smaller storage capacity than the second tier storage medium.

3. The apparatus of claim 2, wherein the bloom filter supports routing at a bit rate of about 3.2 terabits per second (Tbps) for relatively small content packets in the order of kilobytes (KB), a bit rate of about eight petabits per second (Pbps) for relatively large content in the order of megabytes (MB), or both.

4. The apparatus of claim 1 further comprising a counting bloom filter associated with the bloom filter and stored on the third tier storage medium, wherein the first tier storage medium comprises a Dynamic Random Access Memory (DRAM), wherein the third tier storage medium comprises a Solid State Drive (SSD), and wherein the second tier storage medium comprises a Hard Disk Drive (HDD).

5. The apparatus of claim 1 further comprising a counting bloom filter associated with the bloom filter and stored on the third tier storage medium, wherein the first tier storage medium comprises a Dynamic Random Access Memory (DRAM), wherein the third tier storage medium comprises a Phase-Change Memory (PCM), and wherein the second tier storage medium comprises a Solid State Drive (SSD).

6. The apparatus of claim 1 further comprising a counting bloom filter associated with the bloom filter and stored on the third tier storage medium, wherein the first tier storage medium, the second tier storage medium, and the third tier storage medium are located on a commodity server, and wherein the bloom filter, the counting bloom filter and the forwarding information log are components hosted on the commodity server.

7. The apparatus of claim 1, wherein the bloom filter is associated with a single port on the router.

8. The apparatus of claim 1 further comprising a counting bloom filter associated with the bloom filter and stored on the third tier storage medium, wherein the bloom filter is associated with a plurality of ports on the router, and wherein the first tier storage medium or the third tier storage medium comprises a port preference table that indicates a preferred forwarding port from the ports associated with the bloom filter.

9. A network component comprising:
   a receiver configured to receive a content comprising a general name prefix;
   a first tier storage medium configured to store a plurality of bloom filters associated with a plurality of general name prefixes and a plurality of corresponding ports;
   a second tier storage medium configured to store a plurality of counting bloom filters associated with the bloom filters, wherein each one of the counting bloom filters indicates a quantity of members for each signature in one corresponding bloom filter;
   a third tier storage medium configured to store a forwarding information log;
   a logic circuitry coupled to the receiver, the first tier storage medium, the second tier storage medium, and the third tier storage medium, configured to compute a plurality of signatures based on the general name prefix of the received content and configured to use the forwarding information log to reconstruct at least some portion of the counting bloom filters, the bloom filters, or both upon system failures; and a transmitter coupled to the logic circuitry and configured to forward the received content on at least one of the ports that are associated with at least one of the bloom filters if the general name prefix is a member of the at least one of the bloom filters.

10. The network component of claim 9, wherein a plurality of general name prefixes are members of a single bloom filter that is associated with a single port, and wherein the single bloom filter comprises a plurality of bits that are set to indicate a plurality of signatures that correspond to the members.

11. The network component of claim 9, wherein a plurality of ports are associated with a single bloom filter, and wherein the received content is forwarded on the ports that are associated with the single bloom filter if the general name prefix of the received content is a member of the single bloom filter.

12. The network component of claim 9, wherein the signatures are computed using a plurality of hashing functions that correspond to the signatures, wherein the same hashing functions are used for a plurality of received general name prefixes, and wherein different signatures are computed for different general name prefixes.

13. The network component of claim 9, wherein each one of the counting bloom filters comprises a subset of bits for each signature that comprises a value that indicates a current quantity of members corresponding to the signature, and wherein the value is increased by one when a member that has a corresponding signature is added to a port associated with the bloom filter and is decreased by one when a member that has a corresponding signature is removed from a set of members of the port.

14. The network component of claim 9, wherein the counting bloom filters, the bloom filters, or both are recovered at a relatively short time window of about few seconds with respect to a content forwarding process.

15. A computer-implemented method comprising:
receiving an item of content;
obtaining a general content prefix from the content;
querying a plurality of bloom filters to find at least one match for the general content prefix;
forwarding the content on at least one port associated with at least one bloom filter matching the general content prefix;
reconstructing, from a forwarding information log, at least some portion of the bloom filters upon a system failure.

16. The method of claim 15 further comprising:
selecting a preferred port that is associated with the general content prefix in a port preference table if the general content prefix is matched with a plurality of ports associated with a plurality of bloom filters; and
forwarding the content on the preferred port.

17. The method of claim 15 further comprising:
computing a plurality of signatures for a new general content prefix using a plurality of hashing functions;
setting a plurality of bits that correspond to the computed signatures in a bloom filter that is associated with a port assigned to the new general content prefix; and
increasing by one a plurality of counters corresponding to the signatures in a counting bloom filter that is associated with the bloom filter and the port.

18. The method of claim 15 further comprising:
computing a plurality of signatures for general content prefix that is a member of a bloom filter and previously assigned to a port associated with the bloom filter;
clearing a plurality of bits that correspond to the computed signatures in the bloom filter that is associated with the port; and
decreasing by one a plurality of counters corresponding to the signatures in a counting bloom filter that is associated with the bloom filter and the port.

19. A router forwarding plane comprising:
a counting bloom filter stored on a first tier storage medium;
a forwarding information log associated with the counting bloom filter and stored on a second tier storage medium, wherein the first tier storage medium has a faster access speed and a smaller storage capacity than the second tier storage medium; and
a third tier storage medium configured to store a plurality of counting bloom filters associated with a plurality of bloom filters, wherein each one of the counting bloom filters indicates a quantity of members for each signature in the corresponding bloom filter; and
a logic circuitry coupled to the first tier storage medium, the second tier storage medium, and the third tier storage medium, configured to use the forwarding information log to reconstruct at least some portion of the counting bloom filters, the bloom filters, or both upon system failures.

20. The apparatus of claim 19, wherein the first tier storage medium comprises a Solid State Drive (SSD), and wherein the second tier storage medium comprises a Hard Disk Drive (HDD).

21. The apparatus of claim 19, wherein the first tier storage medium comprises a Phase-Change Memory (PCM), and wherein the second tier storage medium comprises a Solid State Drive (SSD).

22. The apparatus of claim 19, wherein the first tier storage medium and the second tier storage medium are located on a commodity server, and wherein the counting bloom filter and the forwarding information log are components hosted on the commodity server.

* * * * *

UNITED STATES PATENT AND TRADEMARK OFFICE
CERTIFICATE OF CORRECTION

PATENT NO. : 8,578,049 B2  Page 1 of 1
APPLICATION NO. : 13/022412
DATED : November 5, 2013
INVENTOR(S) : Jianming Wu and Guangyu Shi

It is certified that error appears in the above-identified patent and that said Letters Patent is hereby corrected as shown below:

In the claims:

Column 15, lines 36-45, claim 15 should read as:
15. A computer-implemented method comprising:
receiving an item of content;
obtaining a general content prefix from the content;
querying a plurality of bloom filters to find at least one match for the general content prefix;
forwarding the content on at least one port associated with at least one bloom filter matching the general content prefix; and
reconstructing, from a forwarding information log, at least some portion of the bloom filters upon a system failure.

Column 16, lines 19-37, claim 19 should read as:
19. A router forwarding plane comprising:
a counting bloom filter stored on a first tier storage medium;
a forwarding information log associated with the counting bloom filter and stored on a second tier storage medium,
wherein the first tier storage medium has a faster access speed and a smaller storage capacity than the second tier storage medium;
a third tier storage medium configured to store a plurality of counting bloom filters associated with a plurality of bloom filters, wherein each one of the counting bloom filters indicates a quantity of members for each signature in the corresponding bloom filter; and
a logic circuitry coupled to the first tier storage medium, the second tier storage medium, and the third tier storage medium, configured to use the forwarding information log to reconstruct at least some portion of the counting bloom filters, the bloom filters, or both upon system failures.

Signed and Sealed this
Seventeenth Day of December, 2013

Margaret A. Focarino
*Commissioner for Patents of the United States Patent and Trademark Office*